United States Patent
Dewey

(10) Patent No.: US 7,734,701 B2
(45) Date of Patent: Jun. 8, 2010

(54) METHOD TO WRITE INFORMATION TO AN INFORMATION STORAGE MEDIUM USING A NETWORK ATTACHED STORAGE DEVICE

(75) Inventor: Douglas W. Dewey, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 1346 days.

(21) Appl. No.: 10/713,399

(22) Filed: Nov. 14, 2003

(65) Prior Publication Data

US 2005/0108243 A1      May 19, 2005

(51) Int. Cl.
*G06F 15/173* (2006.01)
(52) U.S. Cl. .................. 709/206; 709/217; 709/226; 711/100
(58) Field of Classification Search .......... 709/212, 709/217, 218, 226, 238; 711/100, 161, 162; 707/10
See application file for complete search history.

(56) References Cited

U.S. PATENT DOCUMENTS

| | | | | |
|---|---|---|---|---|
| 4,262,332 A | * | 4/1981 | Bass et al. | 711/114 |
| 5,802,599 A | * | 9/1998 | Cabrera et al. | 711/170 |
| 6,434,681 B1 | | 8/2002 | Armangau | 711/162 |
| 7,120,654 B2 | * | 10/2006 | Bromley | 711/161 |
| 7,165,096 B2 | * | 1/2007 | Soltis | 709/217 |
| 2002/0138502 A1 | | 9/2002 | Gupta | 707/200 |
| 2003/0004746 A1 | | 1/2003 | Kheirolomoom et al. | 705/1 |

* cited by examiner

*Primary Examiner*—Ramy M Osman
(74) *Attorney, Agent, or Firm*—Dale F. Regelman; Quarles & Brady LLP

(57) ABSTRACT

A method to write information to an information storage medium comprising a plurality of storage blocks interconnected with a networked attached storage device comprising a first file system, a first file system driver, a second file system and a second file system driver. Using the first file system driver, the method opens a file with write permission, and provides a second file comprising the entire first file system. Using the second file system driver, the method locates an Extent Descriptor associated with the file, reads an address from that Extent Descriptor, where the address points to one or more storage blocks disposed in the information storage medium, and determines if any storage blocks have been allocated for the file. In the event no storage blocks have been allocated for the file, the method then allocates one or more storage blocks, and writes the file to those one or more storage blocks.

20 Claims, 4 Drawing Sheets

METHOD TO WRITE INFORMATION TO AN INFORMATION STORAGE MEDIUM USING A NETWORK ATTACHED STORAGE DEVICE

FIELD OF THE INVENTION

This invention relates to an apparatus and method to write information to an information storage medium using a network attached storage device. More specifically, the invention relates to an apparatus and method to write computer files to an information storage medium using a network attached storage device.

BACKGROUND OF THE INVENTION

Storage area networks (SANs) are dedicated networks that connect one or more hosts or servers to storage devices and subsystems, such as an automated media library. SANs may include an appliance, such as a networked attached storage device ("NASD").

A NASD comprises storage elements or devices that connect to a network and provide file access services to, for example, one or more host computer systems. NASD devices attach directly to networks, such as local area networks, using traditional protocols such as Ethernet and TCP/IP, and serve files to one or more hosts or clients connected to the network. A NASD typically consists of an engine, which implements the file access services, and one or more storage devices, on which data is stored. A computer host system that accesses a NASD typically uses a file system device driver to access the stored data. The file system device driver typically implements file access commands. The file system driver disposed in a NASD interprets these commands and performs the internal device input/output (I/O) operations necessary to execute those file access commands.

Using prior art apparatus and methods, when a user, i.e. a host computer, designates a certain size for a file system, a corresponding number of storage blocks are allocated to that file system. Thus using these prior art methods, storage blocks are allocated for future anticipated file system needs. Certain file systems and the files they contain do not require all the allotted storage blocks, and therefore, certain storage blocks are not used.

What is needed is a method to allocate storage space to a file system when files are actually written to that file system, thereby allowing a better allocation of information storage resources. Applicant's network attached storage device, and method using same, allocates storage space to a file system when files are actually written to that file system. In addition, Applicants' method can provide point-in-time copies of a file system.

SUMMARY OF THE INVENTION

Applicants' invention includes a network attached storage device comprising a first file system, a first file system driver, a redirection pseudo device driver, a second file system, and a second file system driver. Applicant's invention further includes a method using Applicant's network attached storage device to write information to an information storage medium comprising a plurality of storage blocks.

Applicant's method opens a first file with write permission. In certain embodiments, the method opens the first file using a first file system driver. The first file system driver stores the entire first file system in a second file managed by a second file system driver. The second file system driver then locates an Extent Descriptor associated with the second file, and reads an address from that Extent Descriptor, where the address points to one or more storage blocks disposed in the information storage medium. In certain embodiments, a redirection pseudo device driver provides the mapping of block level IO commands generated by the first file system driver to file system IO commands issued to the second file system driver. The second file system driver performs the locating and reading steps to the storage blocks disposed in the information storage medium.

The method then determines if the one or more first storage blocks have been allocated for the file. In the event the one or more storage blocks have not been allocated for the file, the method then allocates those one or more first storage blocks, and writes the file to those one or more first storage blocks. In certain embodiments, a second file system driver performs the determining, allocating, and writing steps.

BRIEF DESCRIPTION OF THE DRAWINGS

The invention will be better understood from a reading of the following detailed description taken in conjunction with the drawings in which like reference designators are used to designate like elements, and in which.

DETAILED DESCRIPTION OF THE PREFERRED EMBODIMENTS

This invention is described in preferred embodiments in the following description with reference to the Figures, in which like numbers represent the same or similar elements. The invention will be described as embodied in an apparatus and method to write host computer files to an information storage medium. The following description of Applicant's apparatus and method is not meant, however, to limit Applicant's invention to data processing applications, as the invention herein can be applied generally to computer file storage and management.

Figure 1:
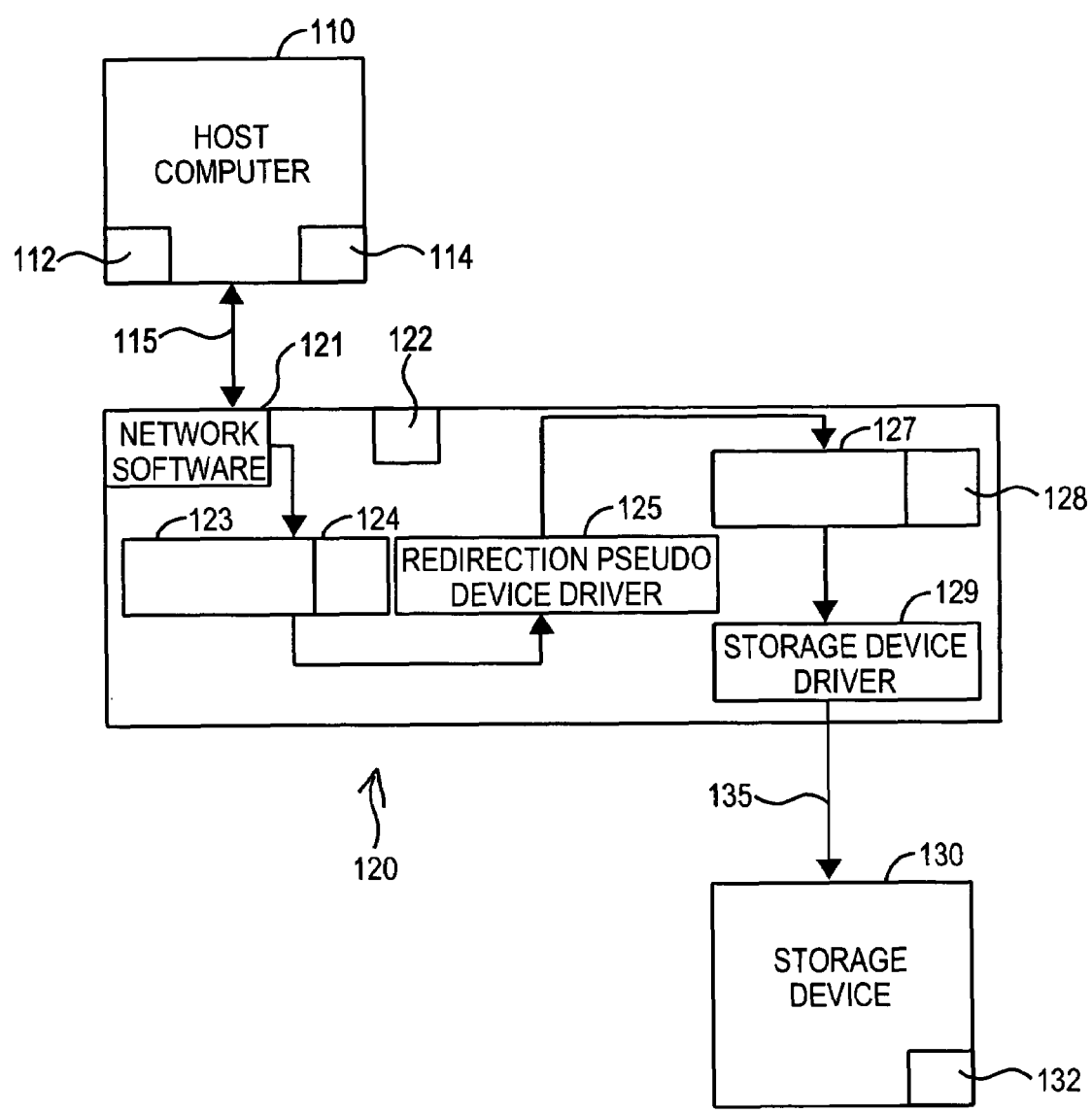
FIG. 1 is a block diagram of Applicant's network attached storage device.

Referring now to FIG. 1, host computer 110 communicates with one or more storage devices 130 via Network Attached Storage ("NASD") device 120 and one or more communication links, such as communication links 115 and 135. In certain embodiments, storage device 130 is disposed in an automated media library.

In certain embodiments, communication links 115 and 135 each separately comprise, for example, a serial interconnection, such as RS-232 or RS-432, an ethernet interconnection, a SCSI interconnection, a Fibre Channel interconnection, an ESCON interconnection, a FICON interconnection, a Local Area Network (LAN), a private Wide Area Network (WAN), a public wide area network, Storage Area Network (SAN), Transmission Control Protocol/Internet Protocol (TCP/IP), the Internet, and combinations thereof. In certain embodiments, communication link 115 comprises a local area network, and communication link 135 comprises a storage area network which includes a plurality of Fibre Channel links.

Host computer 110 comprises a computer system, such as a mainframe, personal computer, workstation, etc., including an operating system 112 such as Windows, AIX, Unix, MVS, LINUX, etc. (Windows is a registered trademark of Microsoft Corporation; AIX is a registered trademark and MVS is a trademark of IBM Corporation; and UNIX is a registered trademark in the United States and other countries licensed exclusively through The Open Group.) In certain embodiments, host computer 110 further includes a storage management program 114. Storage management program 114 may include the functionality of storage management type programs known in the art that manage the transfer of data to a data storage and retrieval system, such as the IBM DFSMS software or the IBM Tivoli Storage Manager software. The storage management program 114 may be implemented as a separate, installed application program. Alternatively, storage management program 114 may include device drivers, backup software, and the like.

Applicant's NASD 120 includes networking software 121 which communicates with one or more host computers using communication link 115. NASD 120 further includes first file system 123, first file system driver 124, redirection pseudo device driver 125, second file system 127, second file system driver 128, and storage device driver 129.

Storage device 130 includes information storage medium 132. In certain embodiments, storage device 130 comprises an external RAID controller and storage medium 132 comprises a hard disk array. In certain embodiments, storage device 130 in combination with storage medium 132 comprises a direct access storage device ("DASD").

In certain embodiments, NASD 120 is integral with host computer 110. In certain embodiments, NASD 120 is integral with a data storage and retrieval system. In certain embodiments, NASD 120 is external to one or more host computers and one or more data storage and retrieval systems. In the embodiment shown in FIG. 1, NASD 120 communicates with a single host computer, i.e. host 110. In other embodiments, NASD 120 communicates with more than one host computer.

Figure 2:
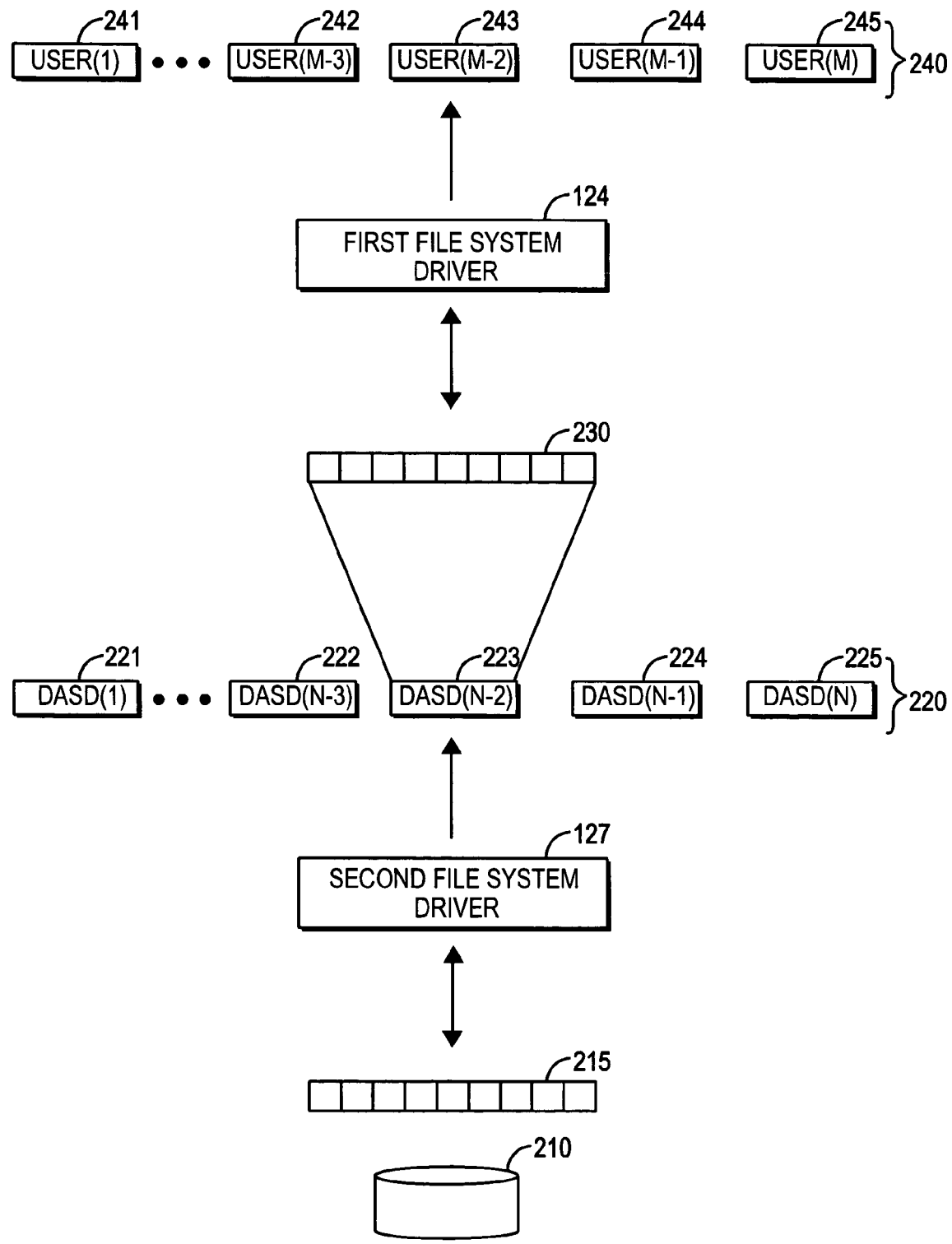
FIG. 2 is a block diagram showing Applicant's file management protocol.

FIG. 2 summarizes Applicant's file management protocol. In the illustrated embodiment of FIG. 2, the storage device 130 of FIG. 1 comprises a direct access storage device ("DASD") 210. Logical Block Array ("LBA") 215 comprises a plurality of DASD files 220 stored on DASD 210. In certain embodiments, LBA 215 includes all the DASD files stored on DASD 210. In certain embodiments, LBA 220 includes fewer than all the DASD files stored on DASD 210. The plurality of DASD files 220 comprises (N) individual DASD files, such as DASD files 221, 222, 223, 224, and 225.

Each of the (N) DASD files 220 comprises a plurality of individual host computer files. For example, DASD file 223 comprises Logical Block Array ("LBA") 230. LBA 230 includes (M) host computer files 240. In certain embodiments LBA 240 comprises all the host computer files comprising DASD file 223. In certain embodiments, LBA 240 includes fewer than all the host computer files comprising DASD file 223.

A user, such as host computer 110 (FIG. 1), accessing DASD 210 uses first file system driver 124 (FIGS. 1, 2) which provides all that user's host computer files stored on DASD 210. Therefore, when a user accesses DASD 210 via the first file system, that user "sees" each individual user file stored on DASD 210.

Figure 3:
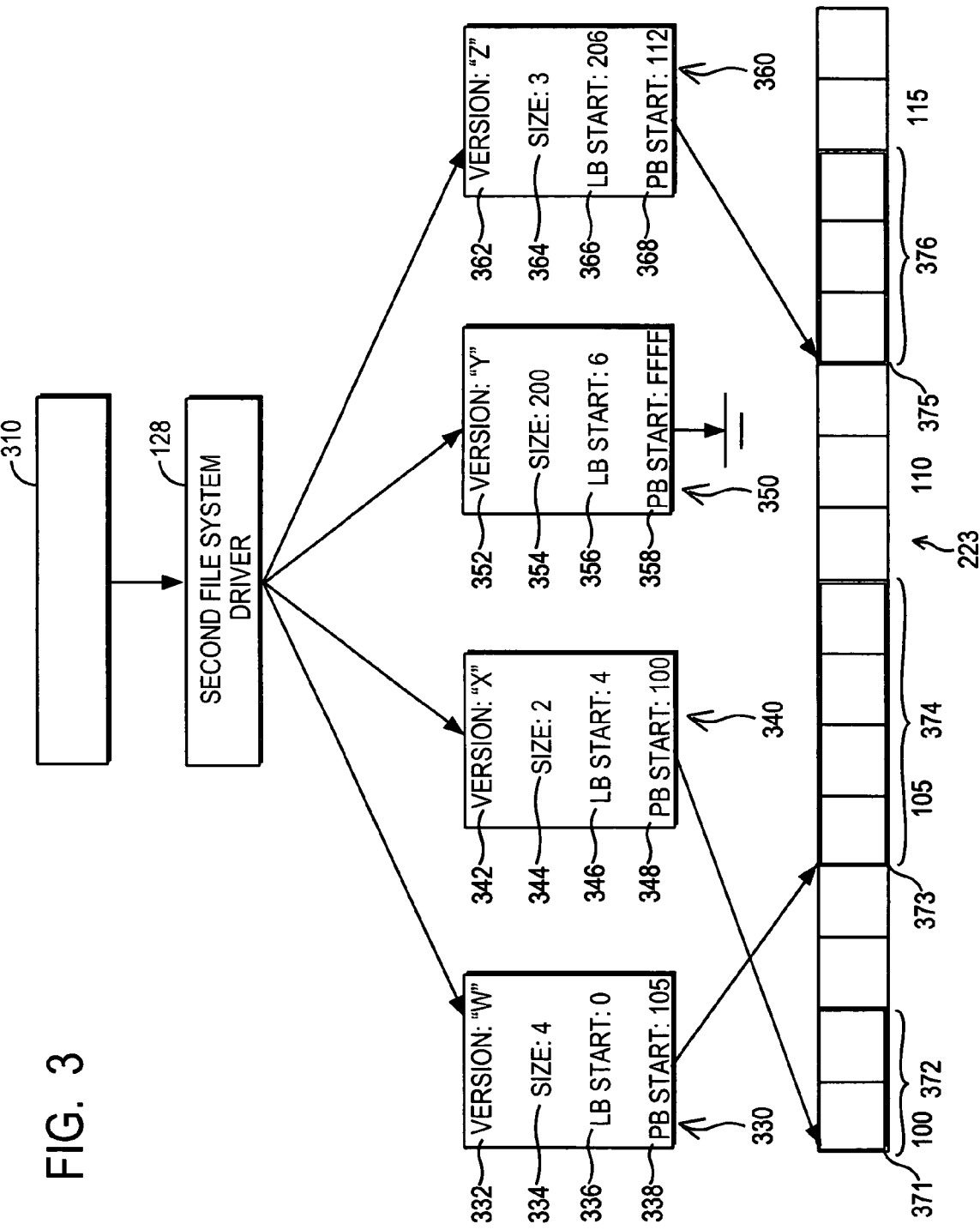
FIG. 3 is a block diagram showing Applicant's second file system driver mapping a file comprising an entire first file system to a plurality of Extent Descriptors.

Referring now to FIG. 3, the first file system driver uses file 310 provided by the second file system driver 128. Second file system driver 128 (FIGS. 1, 3) maps file 310 to a plurality of Extent Descriptors. In the illustrated embodiment of FIG. 3, that plurality of Extent Descriptors include Extent Descriptor 330, Extent Descriptor 340, Extent Descriptor 350, and Extend Descriptor 360. A user, i.e. a host computer, viewing file 310 would determine that file 310 comprises 209 KB. In the illustrated embodiment of FIG. 3, each physical block comprises 1 KB. In the illustrated embodiment of FIG. 3, however, only 9 KB of storage space have actually been allocated to file 310.

Extent Descriptor 330 indicates that a first portion of file 310 is saved on DASD file 223 starting at address 105, i.e. beginning at location 373. Extent Descriptor 330 further indicates that four 1 KB blocks, i.e. blocks 374, have actually been allocated to user file 312. Extent Descriptor 330 further indicates that version "W" is stored in blocks 374.

Extent Descriptor 340 indicates that a second portion of file 310 is saved on DASD file 223 starting at address 100, i.e. beginning at location 371. Extent Descriptor 340 further indicates that two 1 KB blocks, i.e. blocks 372, have actually been allocated to user file 314. Extent Descriptor 330 further indicates that version "X" is stored in blocks 374.

Extent Descriptor 350 comprises what is sometimes called a "skip descriptor." By reciting an address of "FFFF," Extent Descriptor indicates that user file 316 is not yet written to DASD file 223, and therefore, no storage blocks have been allocated for file 316. Extent Descriptor 330 recites no version identifier.

Extent Descriptor 360 indicates that a third portion of file 310 is saved on DASD file 223 starting at address 112, i.e. beginning at location 375. Extent Descriptor 360 further indicates that three 1 KB blocks, i.e. blocks 376, have actually been allocated to user file 318. Extent Descriptor 360 further indicates that version "Z" is stored in blocks 376.

Applicant's invention further includes a method to write host computer files to an information storage medium using a NASD comprising a first file system, such as first file system 123 (FIG. 1), a first file system driver, such as first file system driver 124 (FIG. 1), a redirection pseudo device driver, such as redirection pseudo device driver 125 (FIG. 1), a second file system, such as second file system 127 (FIG. 1), and a second file system driver, such as second file system driver 128 (FIG. 1).

Figure 4:
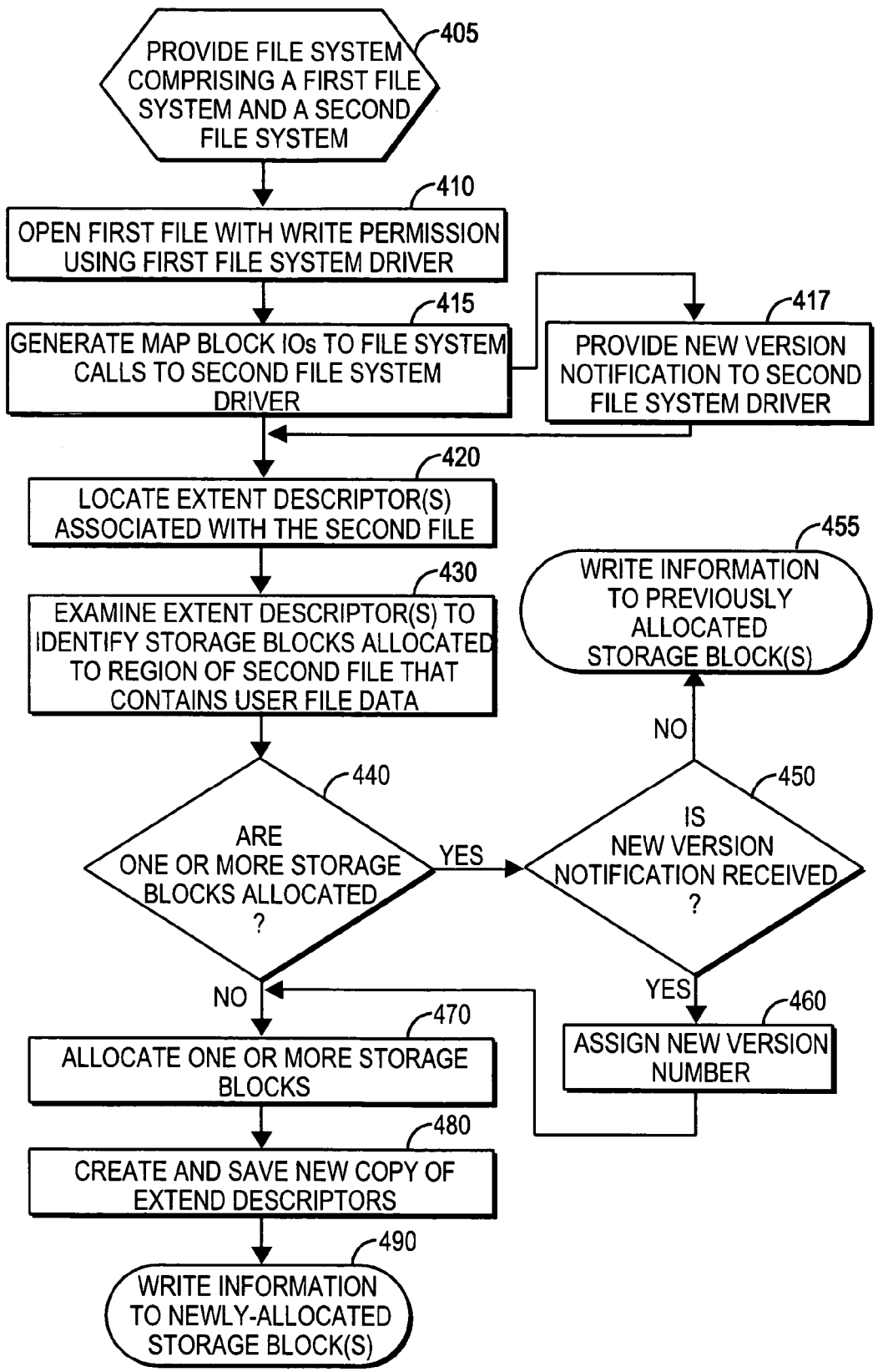
FIG. 4 is a flow chart summarizing the steps of Applicant's method.

Referring now to FIG. 4, in step 405 Applicant's method provides a NASD, such as NASD 120 (FIG. 1), comprising a first file system, a first file system driver, a redirection pseudo device driver, a second file system, and a second file system driver. In step 410, Applicant's method opens a file with write permission.

Using Applicant's apparatus and method, an open of a file in the file system of the first file system driver with write permission does not automatically increment the versioning of the underlying file in the file system of the second file system driver. Rather, a new version is only made upon notification. The user, i.e. a host computer, provides such a notification. In certain embodiments, when to make such a user notification is determined by one or more user policies. For example, a user policy may require that a new version number be assigned to all files modified after midnight of each day. In certain embodiments, such a user policy is set in firmware disposed in the redirection pseudo device driver, such as redirection pseudo device driver 125 (FIG. 1). In certain embodiments, such a user policy is set in firmware disposed in the second file system driver, such as second file system driver 128 (FIG. 1).

In certain embodiments, step 410 is performed by a host computer, such as host computer 110 (FIG. 1). In certain embodiments, step 410 is performed by a NASD, such as NASD computer 120 (FIG. 1). In certain embodiments, step 410 is performed by a first file system driver, such as first file system driver 124.

Applicant's method transitions from step 410 to step 415 wherein Applicants' NASD generates map block IOs to file system calls to the second file system driver. In certain embodiments, step 415 is performed by the first file system driver.

Applicants' method transitions from step 415 to step 420 wherein Applicants' NASD locates one or more Extent Descriptors associated with the file of step 410. In certain embodiments, step 420 is performed by a second file system driver. Each of the Extent Descriptor(s) of step 420 comprises an address. If one or more storage blocks have been previously allocated to the file of step 410, then the address in an Extent Descriptor points to one or more of those storage blocks. Alternatively, if one or more storage blocks have not been allocated to the file, then the address in the Extent Descriptor comprises a "fictitious address" which does not point to allocated storage blocks.

Applicant's method transitions from step 420 to step 430 wherein Applicants' NASD examines the Extent Descriptor(s) of step 420 to identify storage blocks possibly allocated to one or more regions of a second file containing user data. In certain embodiments, step 430 is performed by a second file system driver.

Applicant's method transitions from step 430 to step 440 wherein Applicants' NASD determines if one or more storage blocks have actually been allocated to the file of step 410. In certain embodiments, step 440 is performed by the second file system driver. In certain embodiments, step 440 is performed by the redirection pseudo device driver.

If Applicant's NASD determines in step 440 that one or more storage blocks have not previously been allocated to the file, then the method transitions from step 440 to step 470 wherein Applicants' NASD allocates one or more storage blocks to the file of step 410. If Applicant's NASD determines in step 440 that one or more storage blocks have been previously allocated, then the method transitions from step 440 to step 450 wherein Applicants' NASD determines if the user, i.e. the sending host computer, provided a new version notification for the file in step 417.

In certain embodiments, the user notification of step 417 comprises a request to take a "Snap Shot." In these embodiments, each version of a file in the second file system represents a Snap Shot Copy of the user file system at the time the versioning notification was made. In these embodiments, step 450 includes determining if the user is making a Snap Shot request.

If Applicant's NASD determines in step 450 that the user opening the file of step 405 did not provide a new version notification, then the method transitions from step 450 to step 455 wherein Applicants' NASD writes the file of step 405 in place, i.e. to the previously allocated physical storage location.

Alternatively, if Applicant's NASD determines in step 450 that the user opening the file of step 405 did provide a new version notification, then the method transitions from step 450 to step 460 wherein Applicants' NASD assigns a new version number to the file of step 405. Applicant's method transitions from step 460 to step 470 wherein Applicants' NASD allocates one or more storage blocks of information storage medium 132 (FIG. 1) for the new version.

Applicant's method transitions from step 470 to step 480 wherein Applicants' NASD creates and saves a new Extent Descriptor for the new version, where that new Extent Descriptor recites the newly-allocated storage blocks of step 470 and the new version number of step 460. In certain embodiments, step 480 is performed by a second file system driver. Applicant's method transitions from step 480 to step 490 wherein Applicants' NASD writes the file of step 410 to the storage blocks of step 470.

Using Applicant's method, reads are allowed from any version of a file. Writes, however, may only be performed on the "active," i.e. the highest version number, of the file. When writing to an Extent Descriptor that already has a storage block allocation, if the version number of the Extent is the same as the active version of the file, then the write is made in place. If the version of the Extent Descriptor is less than the active version of the file, then one or more new storage blocks are allocated, and the Extent Descriptor is altered to point to the new allocations and is given a version equal to the active version.

In certain embodiments, the Extent Descriptors are saved in duplicate. In certain embodiments, all modifications to meta information, i.e. version numbers and Extent Descriptors, are committed synchronously to a file write and not cached until file close, background commit, or volume unmount.

In certain embodiments, Applicants' invention includes instructions residing in non-volatile memory 122 (FIG. 1), where certain of those instructions are executed by Applicants' first file system driver to perform steps 410 and 420 recited in FIG. 4, and where other of those instructions are executed by Applicants' second file system driver to perform steps 420 through 490 recited in FIG. 4. In other embodiments, Applicants' invention includes instructions residing in any other computer program product, where those instructions are executed by a computer external to, or internal to, Applicants' NASD, to perform steps 410 through 490 recited in FIG. 4. In either case, the instructions may be encoded in an information storage medium comprising, for example, a magnetic information storage medium, an optical information storage medium, an electronic information storage medium, and the like. By "electronic storage media," Applicants mean, for example, a device such as a PROM, EPROM, EEPROM, Flash PROM, compactflash, smartmedia, and the like.

While the preferred embodiments of the present invention have been illustrated in detail, it should be apparent that modifications and adaptations to those embodiments may occur to one skilled in the art without departing from the scope of the present invention as set forth in the following claims.

I claim:

1. A method to write information to an information storage medium comprising a plurality of storage blocks using an interconnected networked attached storage device comprising a first file system, a first file system driver, a second file system, and a second file system driver, comprising the steps of:

opening a first file from said first file system with write permission;

providing a second file comprising said entire first file system;

locating a first Extent Descriptor associated with said second file, wherein said Extent Descriptor comprises a physical block starting address;

determining if said physical block starting address comprises a fictitious address which does not point to allocated physical storage blocks comprising a contiguous region of data;

operative if said physical block starting address comprises a fictitious address that does not point to allocated physical storage blocks comprising a contiguous region of data, allocating to said second file one or more storage blocks of said information storage medium; and writing said first file to said one or more allocated storage blocks.

2. The method of claim 1, further comprising the steps of:
assigning a version number for said first file;
creating a second Extent Descriptor, wherein said second Extent Descriptor recites said version number; and
saving said second Extent Descriptor.

3. The method of claim 1, wherein said network attached storage device is capable of communicating with a host computer, further comprising the steps of:
operative if one or more storage blocks were previously allocated to said first file, determining if a new version notification was received from said host computer;
operative if a new version notification was not received from said host computer, writing said first file to said one or more previously allocated storage blocks.

4. The method of claim 3, further comprising the step of providing by said host computer a Snap Shot request, wherein said Snap Shot request comprises said new version notification.

5. The method of claim 3, wherein said first Extent Descriptor recites a first version number for said file, further comprising the steps of:
operative if a new version notification has been received:
assigning a second version number to said file;
allocating one or more second storage blocks to said file, wherein said one or more second storage blocks have a second address, and wherein said plurality of storage blocks comprise said one or more second storage blocks;
creating a second Extent Descriptor for said first file, wherein said second Extent Descriptor comprises said second version number, said one or more second storage blocks, and said second address;
saving said second Extent Descriptor; and
writing said first file to said one or more second storage blocks.

6. The method of claim 1, further comprising the steps of:
performing said opening step and said providing step by said first file system driver;
performing said locating, reading, determining, allocating, and writing steps by said second file system driver.

7. The method of claim 1, wherein said first file system comprises a plurality of first logical block arrays, wherein each of said plurality of first logical block arrays comprises a plurality of user files, and wherein said second file system comprises a plurality of second logical block arrays, wherein each of said plurality of second logical block arrays comprises a plurality of first logical block arrays.

8. The method of claim 7, wherein said information storage medium comprises a DASD, further comprising the steps of:
writing said file to a first one of said plurality of first logical block arrays;
writing said first one of said plurality of first logical block arrays to a first one of said plurality of second logical block arrays;
writing said first one of said plurality of second logical block arrays to said DASD.

9. An article of manufacture capable of communicating with an information storage medium, comprising a computer readable medium having computer readable program code disposed therein to write information to said information storage medium, the computer readable program code comprising a series of computer readable program steps to effect:
opening a file with write permission;
locating a first Extent Descriptor associated with said file, wherein said Extent Descriptor comprises a physical block staffing address;
determining if said physical block starting address comprises a fictitious address which does not point to allocated physical storage blocks comprising a contiguous region of data;
operative if said physical block starting address comprises a fictitious address that does not point to allocated physical storage blocks comprising a contiguous region of data, allocating one or more first storage blocks to said file; and
writing said file to said one or more first storage blocks.

10. The article of manufacture of claim 9, said computer readable program code further comprising a series of computer readable program steps to effect:
assigning a version number to said file;
creating a second Extent Descriptor, wherein said second Extent Descriptor comprises said version number; and
saving said second Extent Descriptor.

11. The article of manufacture of claim 9, wherein said article of manufacture is capable of communicating with a host computer, said computer readable program code further comprising a series of computer readable program steps to effect:
operative if one or more storage blocks were previously allocated to said file, determining if a new version notification was received from said host computer;
operative if a new version notification was received, writing said file to said one or more previously allocated storage blocks.

12. The article of manufacture of claim 11 said computer readable program code further comprising a series of computer readable program steps to effect receiving from said host computer a Snap Shot request when opening said file, wherein said Snap Shot request comprises a new version notification.

13. The article of manufacture of claim 9, wherein said first Extent Descriptor comprises a first version number for said file, said computer readable program code further comprising a series of computer readable program steps to effect:
receiving a new version notification from said host computer;
assigning a second version number to said file;
allocating one or more second storage blocks to said file, wherein said one or more second storage blocks have a second address, and wherein said plurality of storage blocks comprise said one or more second storage blocks;
creating a second Extent Descriptor for said file, wherein said second Extent Descriptor comprises said second version number, said one or more second storage blocks, and said second address;
saving said second Extent Descriptor; and
writing said file to said one or more second storage blocks.

14. The article of manufacture of claim 9, further comprising a first file system driver, a redirection pseudo device driver, and a second file system driver, said computer readable program code further comprising a series of computer readable program steps to effect:
performing said opening step by said first file system driver;
performing said locating, reading, determining, allocating, and writing steps by said second file system driver.

15. The article of manufacture of claim 14, further comprising a first file system and a second file system, wherein said first file system comprises a plurality of first logical block arrays, wherein each of said plurality of first logical block arrays comprises a plurality of user files, and wherein said second file system comprises a plurality of second logical block arrays, wherein each of said plurality of second logical block arrays comprises a plurality of first logical block arrays, said computer readable program code further comprising a series of computer readable program steps to effect:

writing said file to a first one of said plurality of first logical block arrays;

writing said first one of said plurality of first logical block arrays to a first one of said plurality of second logical block arrays;

writing said first one of said plurality of second logical block arrays to said information storage medium.

16. A computer program product usable with a programmable computer processor and encoded in an information storage medium, wherein said computer program product is disposed in a network attached storage device capable of communicating with said information storage medium, comprising:

computer readable program code which causes said programmable computer processor to open a file with write permission;

computer readable program code which causes said programmable computer processor to locate a first Extent Descriptor associated with said file, wherein said Extent Descriptor comprises a physical block starting address;

computer readable program code which causes said programmable computer processor to determine if said physical block starting address comprises a fictitious address which does not point to allocated physical storage blocks comprising a contiguous region of data;

computer readable program code which, if said physical block starting address comprises a fictitious address that does not point to allocated physical storage blocks comprising a contiguous region of data, causes said programmable computer processor to allocate one or more first storage blocks to said file; and computer readable program code which causes said programmable computer processor to write said file to said one or more first storage blocks.

17. The computer program product of claim 16, further comprising:

computer readable program code which causes said programmable computer processor to assign a version number for said file;

computer readable program code which causes said programmable computer processor to create a second Extent Descriptor, wherein said second Extent Descriptor comprises said version number; and computer readable program code which causes said programmable computer processor to save said second Extent Descriptor.

18. The computer program product of claim 16, wherein said network attached storage device is capable of communicating with a host computer, further comprising:

computer readable program code which, if one or more storage blocks were previously allocated to said file, causes said programmable computer processor to determine if a new version notification was received from said host computer;

computer readable program code which, if a new version notification was not received from said host computer, causes said programmable computer processor to write said file to said one or more previously allocated storage blocks.

19. The computer program product of claim 18, further comprising computer readable program code which causes said programmable computer processor to receive from said host computer a Snap Shot request when opening said file, wherein said Snap Shot request comprises said new version notification.

20. The computer program product of claim 16, wherein said first Extent Descriptor comprises a first version number for said file, further comprising:

computer readable program code which causes said programmable computer processor to receive a new version notification from said host computer;

computer readable program code which causes said programmable computer processor to assign a second version number to said file;

computer readable program code which causes said programmable computer processor to allocate one or more second storage blocks to said file, wherein said one or more second storage blocks have a second address, and wherein said plurality of storage blocks comprise said one or more second storage blocks;

computer readable program code which causes said programmable computer processor to create a second Extent Descriptor for said file, wherein said second Extent Descriptor recites said second version number, said one or more second storage blocks, and said second address;

computer readable program code which causes said programmable computer processor to save said second Extent Descriptor; and computer readable program code which causes said programmable computer processor to write said file to said one or more second storage blocks.

* * * * *